United States Patent [19]
Balban

[11] 3,863,208
[45] Jan. 28, 1975

[54] VEHICLE SAFETY SYSTEM CONTROL CIRCUIT HAVING A MALFUNCTION INDICATOR

[75] Inventor: Morton S. Balban, Oak Park, Mich.

[73] Assignee: Eaton Corporation, Cleveland, Ohio

[22] Filed: Feb. 19, 1974

[21] Appl. No.: 443,582

Related U.S. Application Data

[63] Continuation of Ser. No. 332,440, Feb. 14, 1973, abandoned.

[52] U.S. Cl............ 340/52 H, 340/248 A, 307/10 R
[51] Int. Cl. ............................................. G08b 21/00
[58] Field of Search..... 340/52 R, 52 B, 52 D, 52 F, 340/52 H, 53, 59, 60, 244, 248 R, 248 A, 248 E; 307/10 R, 10 LS

[56] References Cited
UNITED STATES PATENTS

| | | | |
|---|---|---|---|
| 3,427,607 | 2/1969 | Oesterle | 340/248 A |
| 3,711,827 | 1/1973 | Houseman | 340/52 F |
| 3,742,447 | 6/1973 | Sognefest | 340/52 F |

*Primary Examiner*—Alvin H. Waring
*Attorney, Agent, or Firm*—Teagno & Toddy

[57] ABSTRACT

A control circuit serves for controlling operation of a passive restraint safety system for protecting vehicle occupants during a collision. The circuit includes a sensing circuit portion for sensing a crash condition and a firing circuit portion for electrically actuating a safety device actuator, such as a detonator coil. Monitoring circuitry serves to continuously monitor both the sensing portion and the firing portion for circuit malfunctions and provides a warning indication to the vehicle operator in the event of a detected malfunction in either circuit portion. The monitoring circuit also monitors a crash sensor arming switch to determine whether it is closed rendering the sensor operable, and monitors the capacitor or redundant supply voltage to determine if that voltage level is proper. Other components and functions are monitored to provide a fault indication in the event of a detected malfunction.

43 Claims, 4 Drawing Figures

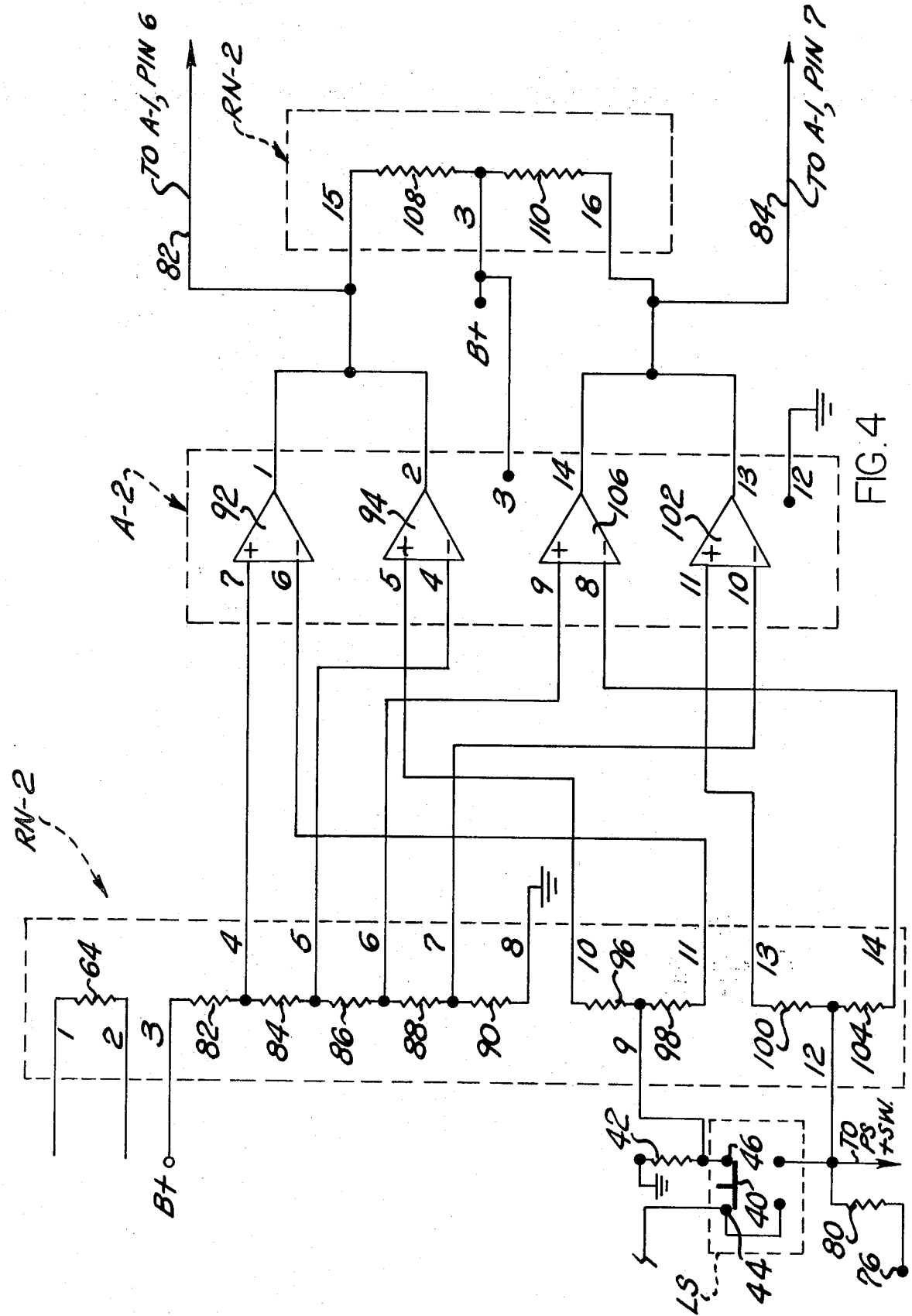

VEHICLE SAFETY SYSTEM CONTROL CIRCUIT HAVING A MALFUNCTION INDICATOR

This is a Continuation, of application Ser. No. 332,440, filed Feb. 14, 1973 and now abandoned.

This invention relates to the art of vehicle safety systems of the passive type in which a vehicle safety device is actuated by a crash sensor control circuit and, more particularly, to improvements in monitoring the control circuit and providing an output indication in the event a malfunction is detected.

A vehicle safety system of the type to which the present invention may be applied is shown in the U.S. Pat. No. to S. Oldberg et al 3,414,292, assigned to the same assignee as the present invention. Such a safety system is of the passive type and generally comprises at least one inflatable confinement which is inflated to restrain movement of a vehicle occupant during a collision. The confinement is inflated when a crash sensor switch detects a vehicle deceleration of a predetermined magnitude. The switch closes to complete an electrical circuit from a power supply circuit so that current flows to energize a vehicle safety device actuator, such as a detonator coil, which in turn causes the confinement to be inflated to its expanded condition.

The safety system control circuit includes both a sensing portion and a firing portion, and both portions must be operative if the confinement is to be inflated in response to vehicle deceleration of a predetermined magnitude. Consequently, it is desirable that the control circuit be monitored to detect malfunctions in either the firing or sensing circuit portions. Preferably, these circuits should be continuously monitored during vehicle operation and upon detecting a malfunction in either circuit a warning indication should be presented to the vehicle operator. It is also desirable that the level of the capacitor or redundant supply voltage for the firing circuits be monitored and that a warning indication be presented to the vehicle operator whenever this voltage is too low. Also, it is desirable that the fluid pressure level of a fluid reservoir for inflating the safety confinement be monitored and that a warning indication be presented to the vehicle operator when the pressure level is too low.

It is therefore a primary object of the present invention to provide an improved control circuit for a vehicle passive restraint system where the control circuit employs means for continuously monitoring the sensing and firing portions of the control circuit during vehicle operation and providing an operator with an indication of a malfunction in either portion.

It is another object of the present invention to provide a safety system control circuit wherein test current continuously flows through both the sensing circuit and firing circuit portions of the control circuit during vehicle operation and wherein a malfunction indication is presented to the vehicle operator in the event the magnitude of the test voltage derived therefrom varies beyond a given limit.

It is a still further object of the present invention to provide a safety system control circuit employing means for providing a vehicle operator with a warning whenever the pressure of a fluid reservoir for use in inflating a passive restraing system confinement is not proper.

It is a still further object of the present invention to provide a vehicle safety control circuit employing means for continuously monitoring the capacitor or redundant power supply for the firing circuit and providing the vehicle operator with a warning whenever the operating voltage for the firing circuit is too low.

It is a still further object of the present invention to provide a safety control circuit having a vehicle deceleration sensor switch and a sensor arming switch which must be closed for the sensor switch to be operative to cause energization of a firing circuit and wherein the arming switch is continuously monitored during vehicle operation to provide the vehicle operator with a warning in the event the arming switch not closed other than during a crash condition.

It is a still further object of the present invention to provide a passive restraint system having a control circuit incorporating means for continuously monitoring various safety system functions and components during vehicle operation and providing the vehicle operator with a malfunction indication in the event that any one or more of the monitored functions or components is malfunctioning.

In accordance with one aspect of the present invention the vehicle safety system control circuit comprises a crash sensor series circuit including a sensor switch and a firing series circuit including an electrically operable actuator for, when electrically operated, actuating a safety device such as an inflatable confinement. A power supply serves to provide operating power for energizing the actuator means. Another switch serves, when closed, to connect the sensor circuit and the firing circuit in series circuit with the power supply so that closure of the sensor switch completes an energizing path for current to flow from the power supply through the sensor switch to energize the safety device actuator. The control circuit also includes means for applying a first test current to flow through the sensor series circuit and a second test current to flow through the firing series circuit. Monitoring circuitry responds to the current flow in each circuit to provide a malfunction indication in dependence upon the magnitude of the test voltage derived therefrom in either circuit.

In accordance with a more limited aspect of the present invention, each series circuit is provided with circuitry for limiting the magnitude of the test current flow therethrough to a magnitude substantially less than that required to energize the safety device actuator.

In accordance with a more limited aspect of the present invention, the sensor switch means is provided with a position switch having a normally closed condition for rendering the sensor means operative and the control circuit includes means for continuously monitoring the condition of the position switch to provide an output malfunction indication in the event that the position switch is open.

In accordance with a still further aspect of the present invention, the second switch is a second sensor switch which is closed in response to a lower level of deceleration than that of said first sensor switch for completing the series circuit from the crash sensor series circuit to the firing circuit.

The foregoing and other objects and advantages of the invention will become more readily apparent from the following description of the preferred embodiment of the invention as taken in conjunction with the accompanying drawings which are a part hereof and wherein.

The present invention provides an improved control circuit for a vehicle safety system of the type which employs a safety device which is operated by an electrically energized actuator upon closure of a crash sensor switch. In accordance with the invention, the control circuit includes a sensor series circuit and a firing series circuit and monitoring means for continuously applying test current to each of the series circuits and providing a malfunction indication in the event that a malfunction occurs in either of the series circuits.

Figure 1:
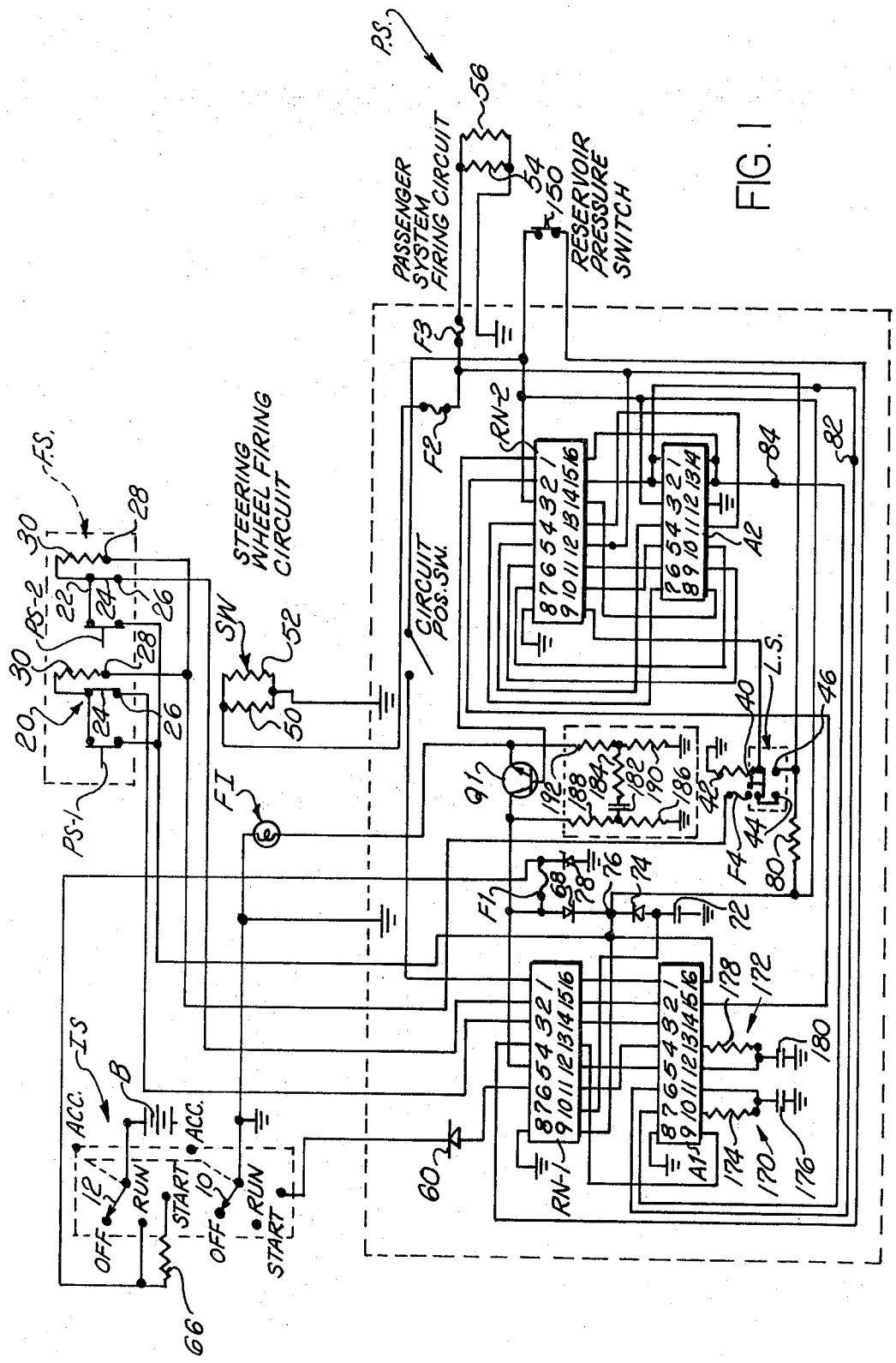
FIG. 1 is a combined schematic-block diagram illustration of the system control circuit constructed in accordance with the present invention.

Referring now to the drawings wherein the showings are for purposes of illustrating preferred embodiments of the invention only and not for purposes of limiting same, FIGS. 1 through 4 illustrate a preferred embodiment of the control circuit constructed in accordance with the present invention. Briefly, the control circuit as depicted in FIG. 1 comprises a sensor series circuit including a forward sensor FS and a low G sensor LS connected in series with each of two parallelly connected series firing circuits, including a steering wheel firing circuit SW and a passenger system firing circuit PS, to the vehicle's battery B through an ignition switch circuit IS. When the low G sensor LS and one of the sensor switches in the forward sensor FS become closed, a series circuit is completed through the ignition switch from the battery B or from the capacitor or redundant power supply to provide firing current to flow through each of the series firing circuits SW and PS to energize firing squibs therein. These firing squibs may take the form of detonator coils which, upon energization, operate to effect activation of an explosive charge to cause gas under pressure to be released from a reservoir to cause an associated expandable confinement to be inflated from a collapsed condition to an expanded condition for purposes of restraining movement of an occupant in the vehicle during a collision. The steering wheel firing circuit SW serves to inflate a confinement adjacent the vehicle steering wheel for purposes of protecting the vehicle operator during a collision and the passenger firing circuit PS serves to inflate a confinement extending from the vehicle's dashboard or the like for purposes of protecting a front passenger during a collision. The location of the firing circuits and which occupants of the vehicle are to be protected is a matter of choice and it is not in itself a subject of this invention.

In accordance with the invention, the control circuit includes logic circuits A1 and A2 which serve in conjunction with associated resistor networks RN1 and RN2 to energize a fault indicator FI to provide the vehicle operator with an indication that a monitored component in the control circuit is malfunctioning. It is contemplated that the control system be connected to the vehicle's ignition switch IS and, thence, to the vehicle's battery B to derive operating power therefrom.

The ignition circuit may take various forms and in the embodiment illustrated the circuit includes a two pole, four position switch including movable switch contacts 10 and 12 each having a start position, a run position, an off position and an accessory position. Movable switch contact 12 is connected to the positive side of the vehicle's battery B and movable switch 10 is connected to vehicle ground and to the negative side of the battery.

The forward sensor FS preferably includes an inertia operated switch which is actuated in response to the vehicle's forward motion achieving a deceleration greater than some predetermined magnitude, such as a 7 to 14 G level. The forward sensor FS should therefore be mounted to a portion of the vehicle to obtain such a response and, for example, the sensor may be mounted forward of the passenger compartment and a suitable location has been found to be adjacent the vehicle's radiator. In the embodiment of the invention illustrated herein the forward sensor FS includes two sensor switches 20 and 22 which are electrically connected together in parallel. These two switches are identical and each includes a movable switch contact 24 having an unactuated position, as shown in the drawings, for completing a circuit with stationary contact 26 and a deceleration actuated position for completing a circuit with stationary contact 28. A relatively large valued resistor 30 is connected from movable contact 24 to the stationary contact 28 and is short circuited whenever the movable contact 24 is positioned to its actuated condition to make electrical engagment with stationary contact 28. Resistor 20 may be on the order of 2 kilohms and serves to limit current flow therethrough to provide a test current which is substantially less than that required to energize the detonator coils in the firing circuits Sw and PS.

Normally closed sensor position switches PS1 and PS2 are associated with the sensor switches 20 and 22. These switches are closed only when the sensor switches 20 and 22 are properly interconnected with the control circuit. Only when the position switches PS1 and PS2 are closed will current flow from the power supply to the input side of switches 20 and 22.

The low G sensor LS is actuated to a closed condition in response to a low level deceleration, such as on the order of 1G. This sensor is preferably mounted adjacent the passenger compartment, such as behind the vehicle dashboard. Low G sensor LS includes a movable switch contact 40, which in its nonactuated position, as shown in the drawings, completes a series circuit from ground through a sensor resistor 42 and thence to the stationary contacts 28 in the forward sensor FS. With the forward sensor movable contacts 24 being in their nonactuated position, as shown in the drawings, and with the low G sensor switch contact being in its nonactuated position, test current flows through resistors 30 in the forward sensor and, thence, through switch contact 40 of the low G sensor LS to develop a voltage across resistor 42. This voltage is monitored by logic circuit A2 in conjunction with its associated resistor network RN2 to determine whether the magnitude of the monitored voltage is indicative of a fault condition. When the low G sensor responds to a low G vehicle deceleration switch contact 40 is displaced to complete a circuit with stationary contacts 44 and 46 for purposes of completing a firing circuit to provide energizing current to flow through the steering wheel firing circuit SW and the passenger system firing circuit PS. However, the magnitude of this current will be insufficient to energize the detonator coils in the firing circuits unless movable contacts 24 in the forward sensor FS are actuated to short circuit the bleed resistors 30.

The firing circuits SW and PS are identical and are connected together in parallel with each being connected to the stationary contact 46 of the low G sensor so that both firing circuits are connected in series with the series sensor circuit comprised of the forward sensor FS and the low G sensor LS described hereinbefore. The steering wheel firing circuit SW includes a pair of redundant detonator coils 50 and 52 connected together in parallel between stationary contact 46 of the low G senor LS and ground. These detonator coils each exhibit a resistance on the order of, but not limited to, 4.5 ohm and require a relatively large magnitude of current flow, such as on the order of 0.5 amp, in order to become energized. Two such detonator coils are provided for purposes of redundancy in the event one becomes defective. Energization of either coil causes detonation of an explosive charge to cause fluid under pressure to be supplied from a reservoir to inflate an associated confinement. The passenger system firing circuit PS, like the steering wheel firing circuit SW, includes a pair of detonator coils 54 and 56 connected together in parallel between ground and contact 46.

Figure 3:
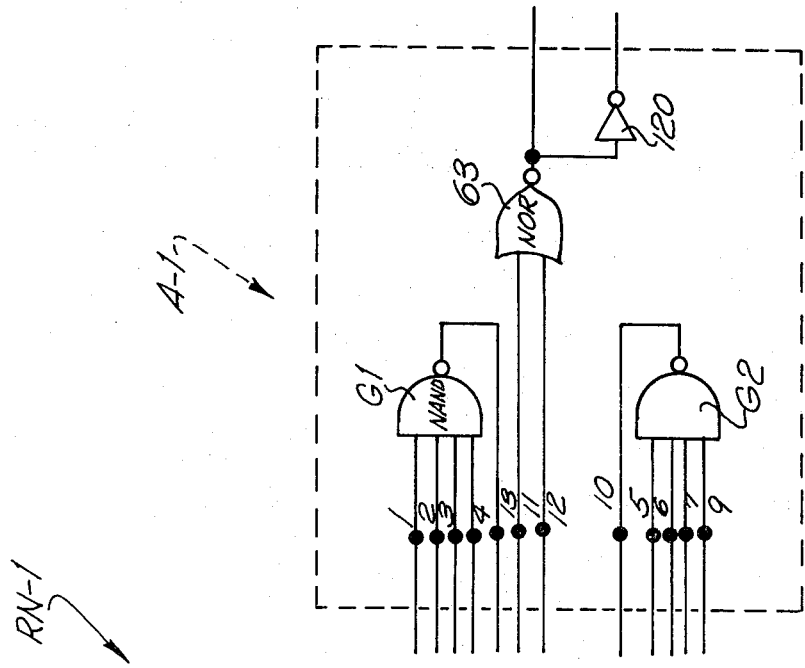
FIG. 3 is a schematic illustration of a logic circuit constructed in accordance with the invention and which is shown in block diagram in FIG. 1; and, FIG. 4 is a schematic illustration of another resistor network and another logic circuit constructed in accordance with the present invention and which are illustrated as block diagrams in FIG. 1.
Figure 2:
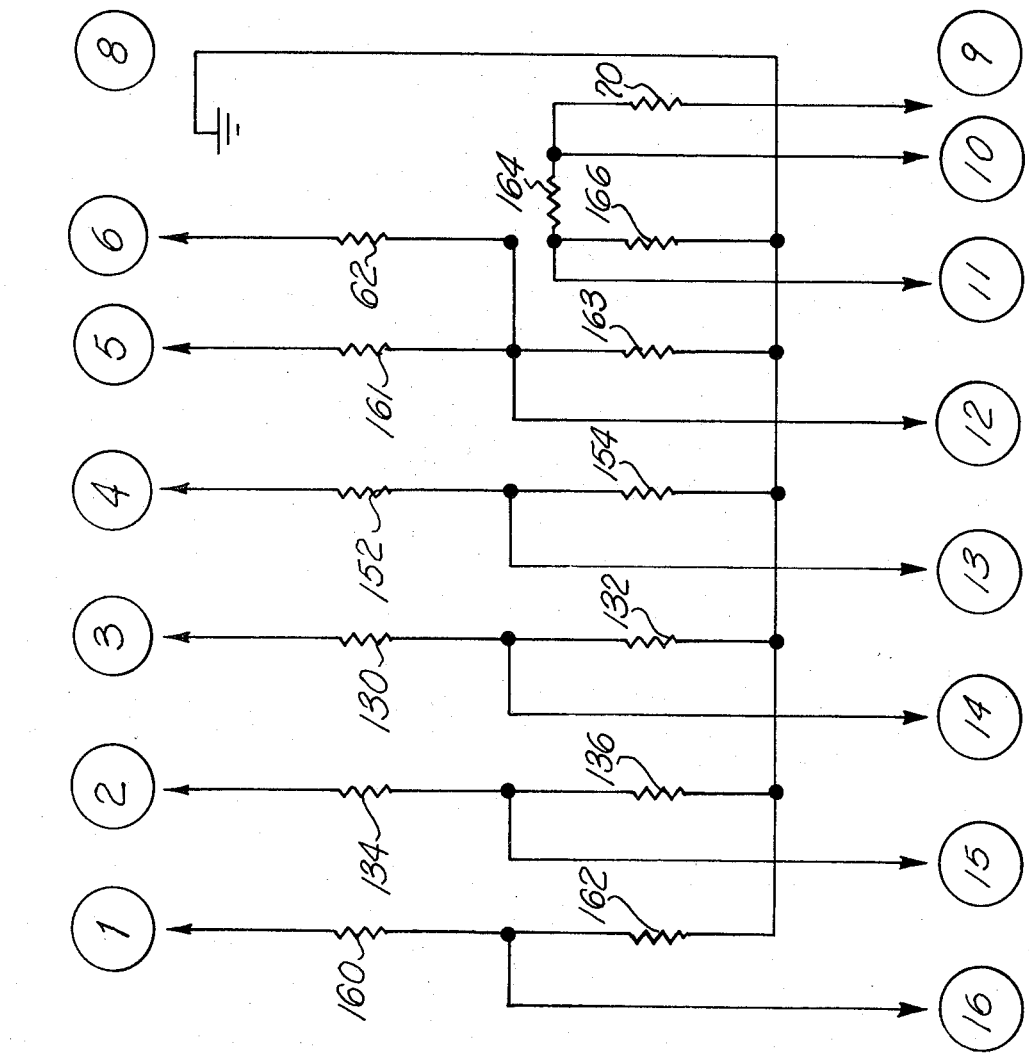
FIG. 2 is a schematic circuit diagram illustrating a resistor network shown in block diagram in FIG. 1.

The fault indicator FI takes the form of a lamp which is preferably mounted on the vehicle's dashboard so as to be observable by the vehicle operator in the event of a fault indication. The fault indicator is energized whenever an NPN transistor Q1 is conducting. This transistor is biased into conduction whenever a fault is detected. In addition, a fault may be simulated by energizing transistor Q1 and the fault indicator FI whenever the ignition switch is placed in its start position. This proves a check on the circuit continuity of the fault indicator as well as the logic circuitry for energizing transistor Q1. This simulated fault is accomplished by ignition switch contact 10 when in its start position. This forward biases a diode 60, poled as shown, connected between the start terminal associated with movable contact 10 and pin 6 of the resistor network RN1. As shown in FIG. 2, pin 6 of resistor network RN1 connects diode 60 through a resistor 62 and thence to an output pin 12 of the resistor network. As shown in FIG. 1, output pin 12 of resistor network RN1 is connected to input pin 5 of the logic circuit A1. This logic circuit is illustrated in FIG. 3 and as will be described in greater detail hereinafter, whenever one of its input pins 1 through 4 or 5, 6, 7 or 9 carries a low level signal, on the order of ground potential, the output potential at pin 15 will carry a positive or binary "1" signal indicative of a fault condition. Consequently, with the simulated fault providing essentially ground potential to input pin 5 of logic circuit' A1, the output circuit of the logic circuit as taken at pin 15 carries a positive fault signal. This positive signal is applied to input pin 2 of the resistor network RN2. Resistor network RN2 is illustrated in detail in FIG. 4 and as seen there an input signal applied to input pin 2 is applied to output pin 1 through a resistor 64. Since output pin 1 of resistor network RN2 is connected to the base of transistor Q1, the transistor is biased into conduction. Current will flow from battery B through movable contact 12, positioned in its start position, through a balancing resistor 66 and through a series path including fuse F1, to the collector of transistor Q1, and from the emitter of transistor Q1 and through the fault indicator I, to energize same, and thence to ground. Consequently, by placing the ignition switch movable contacts 10 and 12 in the start position, the fault indicator FI should be energized to provide the vehicle operator with an indication that the fault indicator and its activating circuitry is operative.

As is conventional, the vehicle's engine is started when the ignition switch is placed in the start position and then the ignition switch is automatically positioned, as with a suitable spring mechanism, to the run position. In this position ignition switch contact 10 performs no function; however, ignition switch contact 12 connects battery B to the control circuit. Current is permitted to flow from the battery B through ignition switch 12 and thence through fuse F1 and a diode 68, poled as shown, to input pin 9 of the resistor network RN1. In the resistor network RN1 the current will flow from input pin 9 through a resistor 70 and thence to output pin 10. From output pin 10 of the resistor network RN1 the current will flow to charge capacitor 72. This capacitor serves as a redundant power supply for providing firing current to energize the detonator coils in the firing circuit SW and PS in the event of loss of operating voltage from the battery, which may be caused, for example, by breakage of the battery cable during a collision condition. Diode 74 connects the capacitor to input pin 9 of the resistor network RN1 so that the voltage developed across resistor 70 reverse biases the diode 74 to normally prevent capacitor 72 from discharging. In the event that battery voltage is lost then the potential at junction point 76 between diodes 68 and 74 will be less than the potential across the capacitor whereupon diode 74 will become forward biased to permit the capacitor to discharge. This provides firing current to flow through the diode and thence through forward sensor FS and the low G sensor LS to energize detonator coils 50 and 52 in firing circuit SW and to energize detonator coils 54 and 56 in firing circuit PS. A Zener diode 78, poled as shown, is connected between ground and fuse F1 to surpress transients during operation.

During normal operation, a low G level deceleration will cause actuation of the low G sensor so that movable contact 40 makes electrical contact with stationary contacts 44 and 46. If the deceleration is sufficient, one or both of the forward sensor switches 20 or 22 will become actuated. In such case, switch contact 24 in the actuated sensor switch will short its associated bleed resistor 30 so that firing current will flow through the closed position switches PS1 and PS2 from junction point 76 with the current being derived either from capacitor 72 in the event of low battery voltage, as discussed hereinbefore, or from battery B. This firing current flows from stationary contacts 28 in the forward sensor FS and thence through fuse F4 and through contacts 44, 40 and 46 of the log G sensor 40 to the firing circuits. At the firing circuits, the current will be split between two parallel paths with one path extending through fuse F2 and then through the detonator coils 50 and 52. Firing current will also flow through fuse F3 and thence through detonator coils 54 and 56.

During vehicle operation, the control circuit serves to continuously monitor the sensor series circuit as well as the firing series circuit. The current flow through the sensor series circuit is limited in magnitude by resistors 30 so that in the event that the low G sensor LS has been actuated but the forward sensor FS has not been actuated the current will be less than that required to energize the detonator coils. With the low G sensor LS being in its unactuated condition then the test current continuously flows through position switches PS1 and PS2 and thence through bleed resistors 30 and through fuse F4 and movable contact 40 of the low G sensor LS to develop a voltage across resistor 42. The magnitude of this voltage is indicative of sensor line continuity. If the voltage across resistor 42 increases in value then this may be indicative of a short circuit condition in the sensing circuit, or that one of the sensor switches 20 or 22 is inadvertently in its actuated position. Such a high voltage across resistor 42 will result in the logic circuitry energizing the fault indicator FI, as will be described in greater detail hereinafter. Also, if the voltage across resistor 42 becomes abnormally low then this condition may be indicative of an open circuit in the sensing circuit, or that one or both of the position switches PS1 and PS2 is in an open condition. Such a low voltage across the resistor 42 may also be indicative of a high impedance being inadvertently located in the series sensing circuit. Regardless of the cause, such a low voltage condition is indicative of a fault condition and the logic circuitry responds to this condition for purposes of energizing the fault indicator FI.

In accordance with the present invention, a test current is also continuously applied so as to flow through the firing circuits SW and PS with the test current being of a magnitude substantially less than that required to energize the detonator coils. This test current is obtained from the power supply connected to junction 76 between diodes 68 and 74. The test current is applied through a bleed or current limiting resistor 80 and thence through fuse F2 and through detonator coils 50 and 52 to ground as well as through the series path comprising fuse F3 and thence through detonator coils 54 and 56 to ground. The voltage developed as measured between point 46 and ground is indicative of the continuity of the firing circuits. If the voltage has decreased in magnitude from its normal level this is indicative that one or more of the detonator coils has become short circuited. If, on the other hand, this voltage has increased in magnitude it is indicative of an open circuit condition, such as a broken detonator coil. Regardless of the cause, either a high voltage or a low voltage relative to the normal voltage level at point 46 is indicative of a fault and the logic circuitry serves to energize the fault indicator FI.

The firing circuit test voltage taken between ground and point 46 and the sensor test voltage taken across resistor 42 are processed by logic circuit A2 and its resistor network RN2 to determine whether either voltage is too high or too low, either condition being indicative of a fault condition as described hereinbefore. So long as the sensor circuit operates normally output circuit 82 taken from the junction of pins 1 and 2 of logic circuit A2 carries a positive signal. If the voltage developed across resistor 42 becomes too high or becomes too low then the potential on output circuit 82 will approach ground potential or a binary "0" signal. Similarly, if the firing circuit test voltage taken between ground and point 46 is normal then output circuit 84 taken from the junction of pins 13 and 14 of logic circuit A2 carries a positive or binary "1" signal. If the test voltage is too high or too low then the potential on output circuit 84 will approach that of ground potential or a binary "0" signal. If a ground potential or binary "0" signal is present at either output circuit 82 or 84 then logic circuit A1 operates to bias transistor Q1 into conduction to energize the fault indicator FI.

The operation of logic circuit A2 and its associated resistor network RN2 is best understood with reference to FIG. 4. As shown in FIG. 4, the sensor test voltage is developed across resistor 42 and is applied to pin 9 of resistor network RN2. Similarly, the firing circuit voltage as developed between ground and stationary contact 46 of the low G sensor LS is applied to pin 12 of the resistor network. Signal levels taken from these two test voltages are then applied to voltage comparator amplifiers located in logic circuit A2 where the signal levels are compared against various voltage reference levels taken from pins 4 through 7 of the resistor network. In each case a signal level representative of the test voltage is applied to different voltage comparators to determine whether the signal level is within an acceptable voltage range. If not, then a low level of binary "0" signal is provided on the associated output circuit 82 or 84.

The voltage reference network is connected between pins 3 and 8 of the resistor network RN2. Pin 8 is connected to ground and pin 3 is connected to a point of positive or B+ potential. Resistors 82, 84, 86, 88 and 90 are connected in series between pin 3 and pin 8 with the junctions between these resistors providing voltage reference levels of declining magnitude at pins 4, 5, 6 and 7.

The sensor test voltage developed across resistor 42 is compared with high and low reference voltages by voltage comparators 92 and 94. Thus, the voltage developed across resistor 42 is applied to pin 9 of the resistor network RN2 and thence through a first resistor 96 to the noninverting input of comparator 94 and through a second resistor 98 to the inverting input of comparator 92. A high level reference voltage is applied to the noninverting input of comparator 92 from pin 4 of the resistor network whereas a lower reference voltage is applied to the inverting input of comparator 94 from output pin 5 of the resistor network. If the signal level across resistor 42 is proper then the magnitude of the signal applied to the inverting input of comparator 92 will be less than the reference voltage applied to the noninverting input of the comparator and the signal applied to the noninverting input of comparator 94 will be greater than the reference voltage applied to the inverting input of that comparator. If these conditions be met then the output circuits of comparators 92 and 94 will each carry a positive or binary "1" signal indicative of a normal voltage level across resistor 42. If, however, the voltage across resistor 42 increases in magnitude to the point that the signal level at the inverting input of comparator 92 is greater than that at the noninverting input then the output circuit of this comparator will carry a binary "0" signal. Similarly, if the voltage across resistor 42 decreases sufficiently in magnitude then the signal applied to the noninverting input of comparator 94 will be less than that applied to the inverting input and the output circuit of this comparator will carry a binary "0" signal. In either case, a binary "0" signal will be provided on output circuit 82 which will cause energization of fault indicator FI.

The firing test voltage taken between ground and stationary contact 46 is applied to input pin 12 of the resistor network RN2 and thence through a first resistor 100 to the noninverting input of a comparator 102 in logic circuit A2 and through a second resistor 104 to the inverting input of a comparator 106 in the logic circuit. A high reference level potential taken from pin 6 of the resistor network RN2 is applied to the noninverting input of comparator 106 and a lower reference potential taken from output pin 7 of the resistor network is applied to the inverting input of comparator 102. If the firing circuit test voltage is proper then the test voltage signal applied to comparators 102 and 106 will be at a potential which is greater than the low level reference signal applied to the inverting input of comparator 102 but less than the high reference level signal applied to the noninverting input of comparator 106. If the firing test voltage is too high then the output circuit of comparator 106 will carry a binary "0" signal, whereas if the firing test voltage is too low the output circuit of comparator 102 will carry a binary "0" signal. If either abnormal test voltage condition takes place a binary "0" signal will be carried by output circuit 84 and this will cause energization of the fault indicator FI.

From FIG. 4 it will be noted that output pins 1 and 2 of logic circuit A2 are connected together and thence to pin 15 of the resistor network RN2. Similarly, pins 13 and 14 of logic circuit A2 are connected together and thence to pin 16 of the resistor network RN2. Resistors 108 and 110 are connected between pins 15 and 16 with their junction being connected to pin 3 and thence to a point of positive or B+ potential. So long as the output circuits of comparators 92 and 94 are not referenced to ground potential essentially a B+ potential is provided for output circuit 82. Similarly, so long as output circuits of comparators 102 and 106 are not referenced to ground potential, output circuit 84 will carry essentially a B+ potential.

As developed in the above description a binary "0" signal taken from either output circuit 82 or output circuit 84 of logic circuit A2 causes logic circuit A1 to bias transistor Q1 into conduction to energize a fault indicator FI. The logic circuit A1 is best shown in FIG. 3 includes two four input NAND gates G1 and G2 having their output circuits applied to a two input NOR gate G3. The output of NOR gate G3 is applied through an inverter amplifier 120 having its output circuit connected to output pin 15 of logic circuit A1. Whenever the output circuit, as taken at pin 15 of logic circuit A1, carries a positive or binary "1" signal this is indicative of a fault condition. This positive signal is applied through resistor 64 between pins 1 and 2 of resistor network RN2 and thence to the base of transistor Q1. The positive signal is sufficient to bias transistor Q1 into conduction so that current will flow from the positive side of battery B through the ignition switch contact 12 and thence through fuse F1, the collector emitter path of transistor Q1 and through the fault indicator, energizing same, to ground.

NAND gate G1 has its four inputs taken from input pins 1 through 4 of logic circuit A1 and NAND gate G2 has its four inputs taken from input pins 5, 6, 7 and 9 of logic circuit A1. As shown in FIG. 1, the sensor test output circuit 82 is connected to input pin 7 of gate G2 whereas the firing circuit test output circuit 84 is connected to input pin 6 of gate G2. As is well known, if any input to a NAND gate carries a binary "0" signal the output circuit of the NAND gate will carry a binary "1" signal. Also, if any input circuit of the NOR gate carries a binary "1" signal its output circuit will carry a binary "0" signal. Consequently, if either circuit 82 or 84 carries a binary "0" signal then the output circuit of G2 will carry a binary "1" signal causing the output circuit of NOR gate G3 to carry a binary "0" signal. This is inverted by inverter amplifier 120 so that the output circuit as taken at pin 15 of logic circuit A1 will carry a binary "1" signal indicative of a fault condition and this will energize fault indicator FI.

Logic circuit A1, in conjunction with resistor network RN1, also monitors other circuit portions for malfunctions and upon such a detection serve to energize the fault indicator. In this context reference is now made to FIG. 2 which illustrates the resistor network RN1 in greater detail. In the normal operation, position switch PS1 is in a closed position and movable contact 24 of sensor switch 20 makes contact with stationary contact 26. If so, then current will flow from the power supply throuth the position switch PS1 and thence through contacts 24 and 26 of sensor switch 20 to input pin 3 of the resistor network RN1 to develop a voltage across a voltage divider comprised of resistors 130 and 132. A reference voltage is taken between ground and the junction of resistors 130 and 132 and is indicative that position switch PS1 is closed and that movable contact 24 is in engagement with stationary contact 26 of sensor switch 20. If circuit continuity is broken in this path then the potential at the junction of resistors 130 and 132 will be essentially that of ground potential. This potential is applied to output pin 14 of the resistor network RN1 and thence to one input circuit of NAND gate G1. If this signal is of a positive potential then a no fault indication will result. If, however, circuit continuity is lost causing a ground potential to be applied to gate G1 then logic circuit A1 operates to provide at its output pin 15 a positive or binary "1" signal for biasing transistor Q1 into conduction to thereby energize the fault indicator FI.

In a manner similar to that as described above, if position switch PS2 is closed and movable contact 24 is in contact with stationary contact 26 of the sensor switch 22 then a path is completed for current flow to input pin 2 of the resistor network so as to develop a voltage across the voltage divider comprised of resistors 134 and 136. An output is taken from the junction of these two resistors and applied to output pin 15 of the resistor network and thence to one input of gate G1 in the logic circuit A1. if this output carries a binary "1" signal then the fault indicator will not be energized. However, if circuit continuity is lost, as by an inadvertent opening of position switch PS2 or an inadvertent actuated sensor switch 22, then the output circuit of the resistor network will carry a ground potential at its output pin 15. This will cause the logic circuit A1 to develop a binary "1" signal at its output pin 15 to cause energization of the fault indicator FI.

The fault indicator FI is also energized in response to an indication of low pressure in the fluid reservoir used to provide gas under pressure to inflate the confinements for restraining movement of vehicle occupants during a collision. A reservoir pressure switch 150 is normally closed so long as the reserve fluid pressure is proper. In the event the switch becomes opened, indicative of a low pressure condition, it is desirable to energize the fault indicator FI. Test current taken from diode junction point 76 will normally and continuously flow through the normally closed reservoir pressure switch 150 and thence to input pin 4 of the resistor network RN1. Consequently, the current flow into the resistor network will develop a voltage across a voltage divider comprised of resistors 152 and 154. The voltage taken between ground and the junction between resistors 152 and 154 is a positive voltage representative that the switch 150 is closed. If the switch becomes opened the voltage at the junction of the two resistors will approach ground potential. Since the junction of resistors 152 and 154 is applied to output pin 13 of the resistor network and thence to one input 9 of gate G2 in the logic circuit A1, such a ground potential will cause the logic circuit A1 to provide a positive or fault output signal to cause energization of the fault indicator FI.

In addition, the position of the circuit module is monitored to provide an indication that proper connection between the module and the restraint system connector exists. This is accomplished by applying current from the junction point 76 to input pin 1 of the resistor network RN1 through the circuit position switch so that a voltage is developed across the voltage divider comprised of resistors 160 and 162. If the module connection is not proper then the voltage developed across the resistor 162 will drop toward that of ground potential and, if so, the potential applied to output pin 16 of the resistor network will apply a binary "0" signal to input pin 1 of NAND gate G1. This will cause the logic circuit A1 to develop a positive fault signal for energizing the fault indicator FI.

The voltage stored by capacitor 72 is also continuously monitored to determine whether it is of sufficient magnitude to properly energize the firing circuits PS and SW in the event the sensor switches become closed. To achieve this the voltage as taken between ground and the junction between capacitor 72 and diode 74 is applied to input pin 10 of the resistor network RN1. This places a voltage across the resistor divider network comprised of resistors 164 and 166. If the voltage stored by the capacitor is too low then the voltage taken between ground and the junction of resistors 164 and 166 will approach that of ground potential. Since the junction of these two resistors is connected to output pin 11 of the resistor network and thence to input pin 4 of NAND gate G1, such a ground potential signal will cause the logic circuit A1 to provide a positive fault output signal to energize the fault indicator FI.

To prevent inadvertent operation of the fault indicator due to a momentary or transient condition which is falsely indicative of a malfunction, as for example, a sudden battery level change upon vehicle start, there is provided transient suppressors 170 and 172 connected to the logic circuit A1. As shown in FIG. 1 transient suppressor 170 is connected to pins 10 and 11 of logic circuit A1 and includes a resistor 174 and a capacitor 176. Transient suppressor 172 is similarly constructed and is connected between pins 12 and 13 of logic circuit A1 and includes a resistor 178 and a capacitor 180. These transient suppressors serve to provide a slight time delay for a fault indication detected by the NAND gates G1 and G2 to determine whether it is merely a transient condition or is indeed representative of a fault. If the fault indication lasts for a period in excess of the RC time constant of these time delay circuits then the logic circuit recognizes the condition as being a fault indication and not a transient condition and energizes the fault indicator FI.

The control circuit also includes a fault time recorder indicator for purposes of providing an indication as to the time duration of a fault condition noted by the control circuit. This is particularly useful for providing a recording of a fault condition noted by the control circuit and permitted to continue by the operator for a substantial period of time. In the embodiment illustrated, the fault time recorder includes a coulometer timing cell 182 connected in series with resistor 184. This series circuit interconnects junctions of a pair of voltage dividers with one being comprised of resistors 186 and 188 connected between ground and the collector of transistor Q1 and the other being comprised of resistors 190 and 192 connected between ground and the emitter of transistor Q1. In the event of a fault condition, a voltage will be established across the two voltage dividers such that a potential difference will take place between the junction of the two voltage dividers. This potential is sufficient for current to flow from the junction of resistors 186 and 188 through coulometer 182 and thence through resistor 184. The coulometer is comprised of two electrodes one being coated with gold and the other with silver. Current flow in the direction from the junction of resistors 186 and 188 to the junction of resistors 190 and 192 causes deposition of silver from the silver coated electrode to the gold coated electrode. The amount of silver deposition on the gold electrode is indicative of the time duration of a fault condition. The time constant may be such that the coulometer acts as a capacitor having a relatively long time constant on the order of 3,000 microamp hours so that if substantially all of the silver is deposited from the silver coated electrode onto the gold coated electrode this would be indicative of 3,000 hours of current flow through the path of the coulometer with the current being on the order of 1 microamp. Consequently, the amount of silver deposition onto the gold plated electrode can be measured to provide an indication as to the duration of a fault condition.

From the foregoing description it is seen that the safety system control circuit continuously monitors the circuit continuity of the sensing series circuit comprised of sensors FS and LS and the two firing circuits SW and PS. If either open or short circuit or incorrect resistance conditions are present in these series circuits a logic circuit A2 provides an output fault indication signal on either output circuit 82 or output circuit 84. Such fault signals are then recognized by logic circuit A1 to energize the fault indicator FI. In addition, the control circuit serves to monitor other operating conditions which if malfunctioning should be detected to provide a fault indication to the vehicle operator. For example, if position switch PS1 is inadvertently opened, indicating that the forward sensor switch 20 is not properly connected in the firing circuit, then this condition will be noted by resistor network RN1 to apply a ground potential signal to logic circuit A1 which, in turn, energizes the fault indicator FI. Similarly, if position switch PS2 is in an open condition, the resistor network RN1 will provide a ground signal which is applied to the logic circuit A1 to energize the fault indicator FI. The resistor network in conjunction with the logic circuit A1 also serves to energize the fault indicator FI if the voltage across capacitor 72 is less than that necessary to energize the firing circuits or that the pressure reservoir switch 150 is open indicating a low pressure level in the gas reservoir for use in expanding the safety confinements or air bags. Also, the voltage across capacitor 72 is monitored to determine whether the voltage level at this point is proper for firing circuit operation. All of these conditions are continuously monitored by the control circuit and if any malfunction be detected the fault indicator is energized. Whenever the vehicle ignition switch IS is placed in its start position, a test is conducted to determine whether the fault indicator FI and its activating circuit including transistor Q1 are operative, otherwise the fault indicator will not be energized. The control circuit also includes a fault time recorder including coulometer 182 for purposes of providing a readout as to the time duration that a fault condition has been allowed to continue.

Whereas the foregoing and other features of the invention have been described in conjunction with a preferred embodiment it is to be appreciated that various modifications may be made to the circuitry employed without departing from the spirit and scope of the invention as defined by the appended claims.

I claim:

1. A vehicle safety system control circuit comprising a crash sensor series circuit and a firing series circuit, said crash sensor series circuit including crash sensor switch means having a normal unactuated condition and an actuated condition representative of a crash condition, said firing series circuit including electrically energizable actuator means for upon energization actuating a vehicle safety device, power supply circuit means for providing operating voltage for said circuits, second switching means having a normal condition and a actuated condition for connecting said sensor series circuit and said firing series circuit together in series with said power supply circuit means so that when said sensor switch means is in its actuated condition an energizing circuit is completed through said sensor switch means and said second switch means for firing current to flow from said power supply circuit means to energize said actuator means, means for continuously effecting flow of a first test current from said power supply circuit means through said sensor series circuit while said second switch means is in its normal condition, means for continuously effecting flow of a second test current from said power supply circuit means through said firing series circuit while said second switch means is in its normal condition, and output circuit means responsive to said test currents for providing an output indication as to a circuit malfunction in either said sensor series circuit or in said firing series circuit in dependence upon the magnitudes of said test currents.

2. A vehicle safety system control circuit as set forth in claim 1 wherein said sensor switch means is actuated to its actuated condition in response to vehicle deceleration of a first predetermined magnitude and said second switching means is a deceleration responsive switch means actuated to its actuated condition in response to vehicle deceleration of a second predetermined magnitude less that that of said first predetermined magnitude so that both switching means must be actuated to their actuated conditions for completion of said energizing circuit for energizing said actuator means.

3. A vehicle safety system control circuit as set forth in claim 1 wherein said means for effecting flow of a first test current includes current limiting means connected across said sensor switching means for limiting said test current flow to a magnitude less than that required to energize said actuator means.

4. A vehicle safety system control circuit as set forth in claim 3 including a second said crash sensor switching means connected in parallel with said first crash sensor switching means with each having a said current limiting means connected thereacross to limit test current flow therethrough to a magnitude less than that required to energize said actuator means.

5. A vehicle safety system control circuit as set forth in claim 3 including normally closed position switch means connected in series with said crash sensor switch means in such a manner that current is permitted to flow through said crash sensor switch means in either its actuated condition or its normal condition only when said position switch means is in its closed condition.

6. A vehicle safety system control circuit as set forth in claim 3 including circuit means for developing a sensor circuit test voltage of a magnitude representative of the magnitude of the first test current flowing through said sensor series circuit.

7. A vehicle safety system control circuit as set forth in claim 6 wherein said output circuit means includes voltage comparing means for comparing said sensor test voltage with a reference voltage and providing a fault output indication in dependence upon said comparison.

8. A vehicle safety system control circuit as set forth in claim 7 wherein said comparing means includes means for comparing said sensor test voltage with a high level reference voltage and a low level reference voltage and providing a said fault indication signal only when said sensor circuit test voltage is not of a magnitude between said low and high reference voltages.

9. A vehicle safety system control circuit as set forth in claim 1 wherein said means for effecting said second test current includes current limiting means connecting said power supply circuit means with said firing series circuit for limiting the magnitude of the said second test current so as to be less than the magnitude required for energizing said actuator means.

10. A vehicle safety system control circuit as set forth in claim 9 wherein said output circuit means includes means for comparing a test voltage developed across said firing series circuit due to said second test current flow therethrough with a refrence voltage and providing a fault indicating output signal in dependence upon said comparison.

11. A vehicle safety system control circuit as set forth in claim 10 wherein said comparing means includes circuit means for comparing said test voltage with a high reference voltage and a low reference voltage and providing a fault indication signal whenever said test voltage is not of a magnitude between that of said high and low reference voltages.

12. A vehicle safety system control circuit as set forth in claim 1 including circuit means for developing a first voltage representative of the magnitude of said first test current and a second voltage representative of the magnitude of said second test current, and said output circuit means includes means responsive to said first and second test voltages for producing an output fault signal in the event that either of said test voltages is of a magnitude outside of a given voltage range associated with that voltage.

13. A vehicle safety system control circuit as set forth in claim 1 wherein said output circuit means includes fault indicator lamp means and means for energizing said fault indicator lamp means to present a visual display representative of a fault condition in said control circuit.

14. A vehicle safety system control circuit as set forth in claim 13 includes circuit means for providing a simulated fault indicating signal and circuit means responsive to said simulated signal for effecting energization of said fault indicating lamp means.

15. A vehicle safety system control circuit as set forth in claim 1 including fault time recorder indicating means for providing an indication representative of the time duration of a said output circuit malfunction.

16. A vehicle safety system control circuit as set forth in claim 1 wherein said output circuit means includes lamp means, logic circuit means for energizing said lamp means in response to a malfunction signal, and circuit means for applying a said malfunction signal to said logic circuit means so long as either said first or said second test current is of a magnitude outside of prescribed limits therefore.

17. A vehicle safety system control circuit as set forth in claim 16 including circuit means for monitoring said capacitor or redundant power supply circuit means for applying a said malfunction signal to said logic circuit means so long as said capacitor or redundant supply voltage is of magnitude less than a predetermined magnitude.

18. A vehicle safety system control circuit as set forth in claim 16 including position switch means having a normally closed condition and connected in series with said sensor switch means to complete a circuit for current flow through said sensor switch means, and circuit means for applying a said malfunction signal to said logic circuit means so long as said position switch means is in an open condition.

19. A vehicle safety system control circuit as set forth in claim 16 including pressure indicating switch means having a normally closed condition and an open condition representative of low fluid pressure in a fluid reservoir for inflating a safety confinement in response to actuation of said electrically actuatable means, and circuit means for applying a said malfunction signal to said logic circuit means so long as said pressure indicating switch means is in its open condition.

20. A monitoring circuit for a system including an electro-explosive device to be actuated by a predetermined minimum current upon the occurrence of a predetermined circumstance, means for sensing the occurrence of the predetermined circumstance, and means providing the minimum current in response thereto, said circuit comprising:
a. means providing a first test current through said sensing means, said first test current being less than said minimum current;
b. means providing a second test current through said electro-explosive device, said second test current being less than said minimum current; and
c. output circuit means responsive to said first and second test currents for providing an indication of a fault in either said sensing means or said electro-explosive device.

21. The circuit as set forth in claim 20 including circuit means for developing first and second test voltages representative of said first and second test currents, and wherein said output circuit means includes means for comparing said first and second test voltages with a reference voltage and providing a fault indication responsive to said comparison.

22. The circuit as set forth in claim 21 wherein said voltage comparing means includes means for comparing said first and second test voltages with a high level reference voltage and with a low level reference voltage and providing a fault indication only when one of said test voltages is either higher than said high level reference voltage or lower than said low level reference voltage.

23. The circuit as set forth in claim 20 wherein said output circuit means includes:
a. indicator means to provide a visual representation of a fault condition in said system; and
b. circuit means for providing a fault indication signal and energizing said indicator means in response thereto.

24. The circuit as set forth in claim 20 including fault time indicating means for providing an indication representative of the time duration of a fault indication.

25. A control circuit for a system including an electro-explosive device to be actuated by a predetermined minimum current upon the occurrence of a predetermined circumstance and means for sensing the occurrence of the predetermined circumstance, said circuit comprising:
a. switch means adapted to be operably connected to the sensing means and having a normal unactuated condition and an actuated condition representative of the occurrence of the circumstance;
b. electrically energizable means for actuating the electro-explosive device in response to said minimum current;
c. said switch means and said actuating means being operably connected electrically in series and adapted to be connected to a source of power;
d. means providing a first test current through said switch means, said first test current being less than said minimum current;
e. means providing a second test current through said actuating means, said second test current being less than said minimum current; and
f. output circuit means responsive to said first and second test currents for providing an indication of a fault in either of said switch means or said actuating means.

26. The circuit as set forth in claim 25 wherein said means providing a first test current includes current limiting means connected across said switch means for limiting said first test current to less than said minimum current.

27. The circuit as set forth in claim 25 wherein said means providing a second test current includes current limiting means connected across said actuating means for limiting said second test current to less than said minimum current.

28. The circuit as set forth in claim 25 including a redundant power supply circuit means capable of being connected electrically in series with said switch means and said actuating means to supply power thereto if a discontinuity occurs in the series electrical connection between said power source, said switch means and said actuating means.

29. The circuit as set forth in claim 28 wherein said redundant power supply circuit means comprises a capacitor, and including means for monitoring said capacitor to provide a fault indication if the voltage stored by said capacitor is less than a predetermined minimum.

30. A control circuit for a system including an electro-explosive device to be actuated by a predetermined minimum current upon the occurrence of a predetermined circumstance and means for sensing the occurrence of the predetermined circumstance, said circuit comprising:
 a. sensor circuit means adapted to be operably connected to the sensing means and including sensor switch means having a normal unactuated condition and an actuated condition representative of the occurrence of the circumstance;
 b. firing circuit means including electrically energizable actuator means for actuating the electro-explosive device in response to said minimum current;
 c. said sensor circuit means and said firing circuit means being operably connected electrically in series and adapted to be connected to a source of power;
 d. means providing a first test current through said sensor circuit means, said first test current being less than said minimum current;
 e. means providing a second test current through said firing circuit means, said second test current being less than said minimum current; and
 f. output circuit means responsive to said test currents for providing an indication of a fault in said sensor circuit means or said firing circuit means.

31. The circuit as set forth in claim 30 wherein said means providing a first test current includes current limiting means connected across said sensor switch means for limiting said first test current to less than said minimum current.

32. The circuit as set forth in claim 30 including normally closed position switch means connected in series with said sensor switch means to permit current to flow through said sensor switch means in both its actuated condition and its normal condition only when said position switch means is in its closed condition.

33. The circuit as set forth in claim 30 including circuit means for developing a sensor circuit test voltage representative of said first test current, and wherein said output circuit means includes means for comparing said sensor circuit test voltage with a reference voltage and providing a fault indication responsive to said comparison.

34. The circuit as set forth in claim 33 wherein said voltage comparing means includes means for comparing said sensor circuit test voltage with a high level reference voltage and with a low level reference voltage and providing an indication of a fault only when said sensor circuit test voltage is either higher than said high level reference voltage or lower than said low level reference voltage.

35. The circuit as set forth in claim 30 wherein said means providing a second test current includes current limiting means adapted to be operably connected between the power source and said firing circuit means for limiting said second test current to less than said minimum current.

36. The circuit as set forth in claim 35 including circuit means for developing a firing circuit test voltage representative of said second test current, and wherein said output circuit means includes means for comparing said firing circuit test voltage with a reference voltage and providing a fault indication responsive to said comparison.

37. The circuit as set forth in claim 36 wherein said voltage comparing means includes means for comparing said firing circuit test voltage with a high level reference voltage and with a low level reference voltage and providing a fault indication only when said firing circuit test voltage is either higher than said high level reference voltage or lower than said low level reference voltage.

38. The circuit as set forth in claim 30 wherein said output circuit means includes:
 a. fault indicator lamp means to provide a visual representation of a fault condition in said control circuit;
 b. means for energizing said fault indicator lamp means;
 c. circuit means for providing a simulated fault indicating signal; and
 d. circuit means responsive to said simulated fault indicating signal for effecting energization of said fault indicator lamp means.

39. The circuit as set forth in claim 30 including fault time recorder indicating means for providing an indication representative of the time duration of a fault indication.

40. The circuit as set forth in claim 30 including a redundant power supply circuit means capable of being connected electrically in series with said sensor circuit means and said firing circuit means to supply power thereto if a discontinuity occurs in the series electrical connection between said power source, said firing circuit means and said sensor circuit means.

41. The circuit as set forth in claim 40 wherein said redundant power supply circuit means comprises a capacitor, and including means for monitoring said capacitor to provide a fault indication if the voltage stored by said capacitor is less than a predetermined minimum.

42. A control circuit for a vehicle occupant restraint system including a crash sensor and an electro-explosive device to be actuated by a predetermined minimum current upon the occurrence of a crash condition, to cause the inflation of an inflatable confinement, said circuit comprising:
 a. crash sensor circuit means adapted to be operably connected to the crash sensor and including sensor switch means having a normal unactuated condition and an actuated condition representative of a crash condition;
 b. firing circuit means including electrically energizable actuator means for actuating the electro-explosive device in response to said minimum current;
 c. said crash sensor circuit means and said firing circuit means being operably connected electrically in series and adapted to be connected to a source of power;

d. means providing a first test current through said crash sensor circuit means, said first test current being less than said minimum current;
e. means providing a second test current through said firing circuit means, said second test current being less than said minimum current; and
f. output circuit means responsive to said test currents for providing an indication of a fault in either of said crash sensor circuit means or said firing circuit means.

43. The control circuit of claim 42 including:
a. pressure indicating switch means having a normally closed condition and an open condition representative of a low fluid pressure in a fluid reservoir adapted to inflate the inflatable confinement; and
b. circuit means for providing a fault indication when said pressure indicating switch means is in said open condition.

* * * * *

UNITED STATES PATENT OFFICE
CERTIFICATE OF CORRECTION

Patent No. 3,863,208          Dated 1/28/75

Inventor(s) Morton S. Balban

It is certified that error appears in the above-identified patent and that said Letters Patent are hereby corrected as shown below:

Col. 4, line 32:     "20" should properly read "30".

Col. 4, line 36:     "Sw" should properly read "SW".

Col. 13, claim 1;
line  36:            "a actuated" should properly read "an actuated".

Signed and sealed this 1st day of April 1975.

(SEAL)
Attest:

RUTH C. MASON
Attesting Officer

C. MARSHALL DANN
Commissioner of Patents
and Trademarks